US008355474B2

(12) United States Patent
De Carvalho et al.

(10) Patent No.: US 8,355,474 B2
(45) Date of Patent: Jan. 15, 2013

(54) APPARATUS AND METHOD FOR INTERFERENCE CANCELLATION IN MULTIPLE-ANTENNA COMMUNICATION SYSTEM

(75) Inventors: Elisabeth De Carvalho, Aalborg (DK); Muhammad Imadur Rahman, Aalborg (DK); David Mazzarese, Suwon-si (KR); Yang Tang, Suwon-si (KR); Jin-Kyu Koo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1321 days.

(21) Appl. No.: 12/098,068

(22) Filed: Apr. 4, 2008

(65) Prior Publication Data
US 2008/0248773 A1  Oct. 9, 2008

(30) Foreign Application Priority Data

Apr. 4, 2007 (KR) .................. 10-2007-0033081

(51) Int. Cl.
*H04B 7/10* (2006.01)
(52) U.S. Cl. ........ 375/347; 375/285; 375/259; 375/260; 375/267; 375/316; 375/346; 375/349

(58) Field of Classification Search ............... 375/285, 375/259, 260, 267, 316, 346, 347, 349
See application file for complete search history.

(56) References Cited

U.S. PATENT DOCUMENTS

| 7,061,854 | B2 * | 6/2006 | Tarokh et al. | 370/206 |
| 7,623,563 | B2 | 11/2009 | Jwa et al. | |
| 2006/0153283 | A1 | 7/2006 | Scharf et al. | |
| 2007/0030914 | A1 * | 2/2007 | Ding et al. | 375/260 |
| 2007/0153935 | A1 * | 7/2007 | Yang et al. | 375/267 |
| 2007/0237268 | A1 * | 10/2007 | Wu et al. | 375/343 |
| 2008/0192857 | A1 * | 8/2008 | Miyoshi et al. | 375/285 |

FOREIGN PATENT DOCUMENTS

| KR | 1020050041348 | 5/2005 |
| KR | 1020050065499 | 6/2005 |
| KR | 1020060065059 | 6/2006 |

\* cited by examiner

*Primary Examiner* — Siu Lee
(74) *Attorney, Agent, or Firm* — The Farrell Law Firm, P.C.

(57) ABSTRACT

An apparatus and method for interference cancellation in multiple-antenna communication system is disclosed. Accordingly, a receiver of a multiple-antenna communication system cancels interference by selecting either a multiple-symbol processing scheme or a single-symbol processing scheme depending on a signal type, thereby improving performance of the communication system.

18 Claims, 6 Drawing Sheets

APPARATUS AND METHOD FOR INTERFERENCE CANCELLATION IN MULTIPLE-ANTENNA COMMUNICATION SYSTEM

PRIORITY

This application claims priority under 35 U.S.C. §119(a) to a Korean patent application filed in the Korean Intellectual Property Office on Apr. 4, 2007 and assigned Serial No. 2007-33081, the entire disclosure of which is hereby incorporated by reference.

BACKGROUND OF THE INVENTION

1. Field of the Invention

The present invention relates to an apparatus and method for interference cancellation in a multiple-antenna communication system. More particularly, the present invention relates to interference cancellation in which a multiple-symbol processing scheme or a single-symbol processing scheme is selected according to a type of an interference signal in a receiver of an Orthogonal Frequency Division Multiple Access (OFDMA)-based multiple-antenna communication system.

2. Description of the Related Art

In general, wireless telecommunication systems provide data services in addition to voice services. To provide a data service with excellent performance, it is necessary to develop a high-speed data communication technology. A system channel capacity can significantly increase in a Multiple Input Multiple Output (MIMO) communication system in which both a transmitter and a receiver use multiple antennas.

Various well-known conventional technologies are used where both the transmitter and the receiver use multiple antennas. Examples of the techniques include Space Time Block Coding (STBC) which is performed by the transmitter to transmit signals through the multiple antennas, whereas the receiver detects the signals received through the multiple antennas according to a multiple-symbol processing scheme, and an interference cancellation technique.

In a communication system, a receiver (i.e., Mobile Station (MS)) may receive a signal from not only a desired transmitter (i.e., a Base Station (BS)) located in a serving cell in which the receiver is located), but also an undesired transmitter (i.e., a BS located in a cell neighboring to the serving cell). In this case, a signal received by the receiver includes an undesired signal transmitted from the undesired transmitter as interference. Since the communication system experiences performance deterioration in the presence of interference, the interference has to be canceled in order to improve the performance of the communication system.

That is, in the communication system, when a receiver using multiple antennas receives an undesired signal (i.e., a signal received from an undesired transmitter), interference occurs to a desired signal (i.e., a signal received from a desired transmitter). In this case, the interference has to be canceled in order to prevent performance deterioration.

On the other hand, in a cellular communication system, when a receiver (i.e., MS) uses multiple antennas, a transmitter (i.e., BS) located in each cell may optionally use either multiple antennas or a single antenna.

A receiver using multiple antennas may receive a signal in two manners. First, the receiver receives a desired signal from a transmitter using a single antenna. Second, the receiver receives the desired signal from a transmitter using multiple antennas. In either case, it may not be effective to use the same interference cancellation scheme if an undesired signal is received from the transmitter using the single antenna and located in a neighboring cell (i.e., in the case of using one logical stream), as for the first case, and if the undesired signal is received from the transmitter using the multiple antennas and located in the neighboring cell, as for the second case.

In particular, interference becomes a big problem if several symbols are correlated, for example, when interference signals (i.e., undesired signals) received from the transmitter located in the neighboring cell are in association with multiple logical streams (e.g., Space-time Block Code (STBC) signals) transmitted from a transmitter having multiple antennas.

Figure 1:
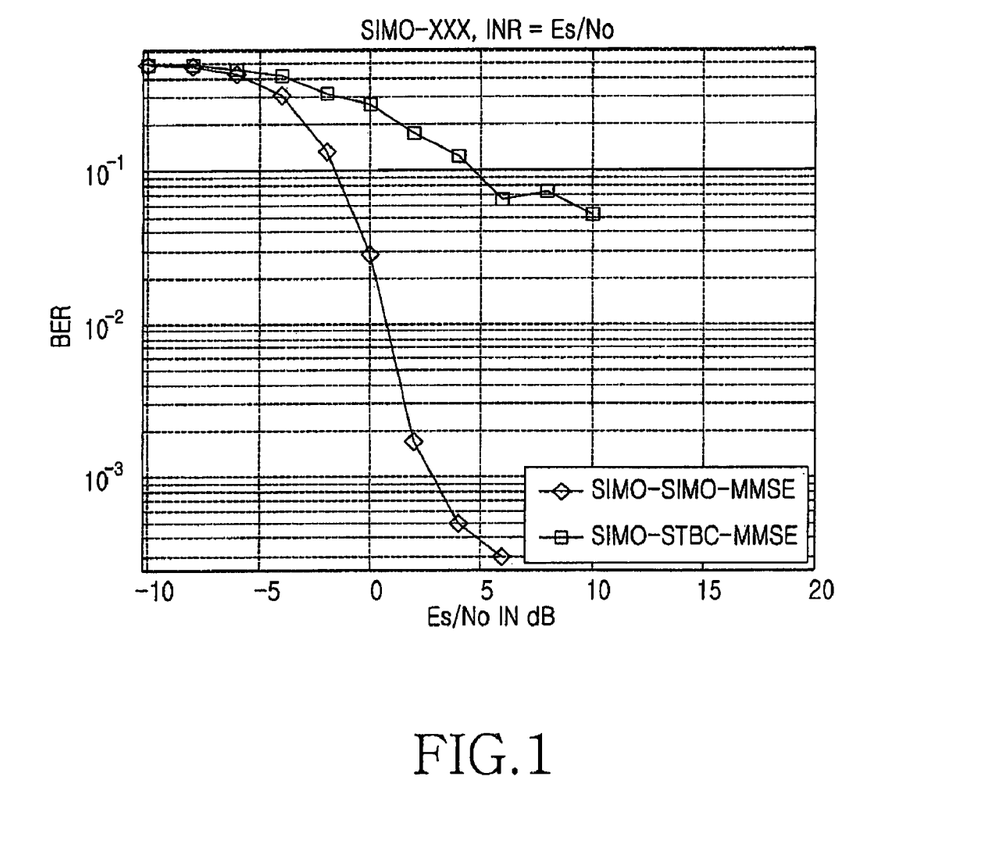
FIG. 1 is a graph illustrating a system performance of a receiver using multiple antennas in the presence of one-logical-stream type interference and multiple-logical-stream type interference.

FIG. 1 is a graph illustrating a system performance of a receiver using multiple antennas in the presence of one-logical-stream type interference and multiple-logical-stream type interference. The graph shows that the performance deteriorates in the presence of the multiple-logical-stream type interference. Herein, the communication system is a Single Input Multiple Output (SIMO) system including a transmitter using one antenna and a receiver using five antennas. In the graph, a case where a transmitter located in a neighboring cell uses one antenna is indicated by SIMO, and a case of using multiple antennas is indicated by STBC. Symbols are detected by using Minimum Mean Squared Error (MMSE) scheme.

Accordingly, an apparatus and method for canceling interference caused by an undesired signal are required whereby, when a receiver using multiple antennas is located in an edge of a cell in a communication system, the interference is canceled if a desired signal is received from a transmitter located in the cell. The cancellation technique differs between a case where the undesired signal is received from a transmitter located in a neighboring cell using one antenna from and a case where the undesired signal is received from a transmitter located in the neighboring cell using multiple antennas.

In addition, an apparatus and method for canceling interference caused by an undesired signal are required, whereby, when a receiver using multiple antennas is located in an edge of a cell in a communication system, the interference is canceled. The cancellation technique differs between a case where a desired signal is received from a transmitter located in the cell using one antenna and a case where the desired signal is received from a transmitter located in the cell and using multiple antennas.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively canceling interference generated upon receiving an undesired signal from an undesired transmitter located in a neighboring cell when a receiver using multiple antennas receives a desired signal from a desired transmitter in a communication system.

Another aspect of the present invention is to provide an apparatus and method for effectively canceling interference by performing a different signal processing scheme according to an interference type of a signal output from an undesired transmitter located in a neighboring cell when a receiver using multiple antennas receives a desired signal from a desired transmitter in a communication system.

According to an aspect of the present invention, a receiver is provided. The receiver includes multiple antennas for receiving signals from a first transmitter and a plurality of second transmitters; a channel estimator for estimating channel coefficients by using the signals received through the multiple antennas; and an interference cancellation and signal processing unit for canceling the signals received through the plurality of second transmitters by using the channel coefficients according to a predetermined interference cancellation scheme, and for outputting the signal received from the first transmitter.

According to another aspect of the present invention, a method of receiving data in a receiver using multiple antennas is provided. The method includes receiving signals from a first transmitter and a plurality of second transmitters; estimating an interference signal covariance matrix for interference signals received from the second transmitters; determining whether an interference type is a Space Time Block Coded (STBC) type by using the estimated interference signal covariance matrix; and if the interference type is the STBC type, canceling interference according to a multiple-symbol processing scheme.

BRIEF DESCRIPTION OF THE DRAWINGS

The above and other aspects, features and advantages of certain preferred embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

The present invention may apply to all communication systems using a Frequency Division Multiple Access (FDMA) scheme, a Time Division Multiple Access (TDMA) scheme, a Code Division Multiple Access (CDMA) scheme, or an Orthogonal Frequency Division Multiple Access (OFDMA)/Orthogonal Frequency Division Multiplexing (OFDM) scheme. Hereinafter, an OFDMA-based communication system will be described as an example.

In the following descriptions, a receiver of an OFDMA-based multiple-antenna communication system cancels interference caused by an undesired signal received together with a desired signal by selecting from one of two schemes (i.e., a multiple-symbol processing scheme and a single-symbol processing scheme) according to a type of the undesired signal. In addition, a type of the desired signal is detected to select an interference cancellation scheme.

That is, it is determined whether the type of the undesired signal is in association with a signal (i.e., one logical stream) received from a transmitter having a single antenna or signals (i.e., multiple logical streams such as Space Time Block Coded (STBC) signals) received from a transmitter having multiple antennas. According to the determination result, a Receive (Rx) symbol processing scheme is determined. Herein, a signal is also referred to as a symbol.

Figure 2:
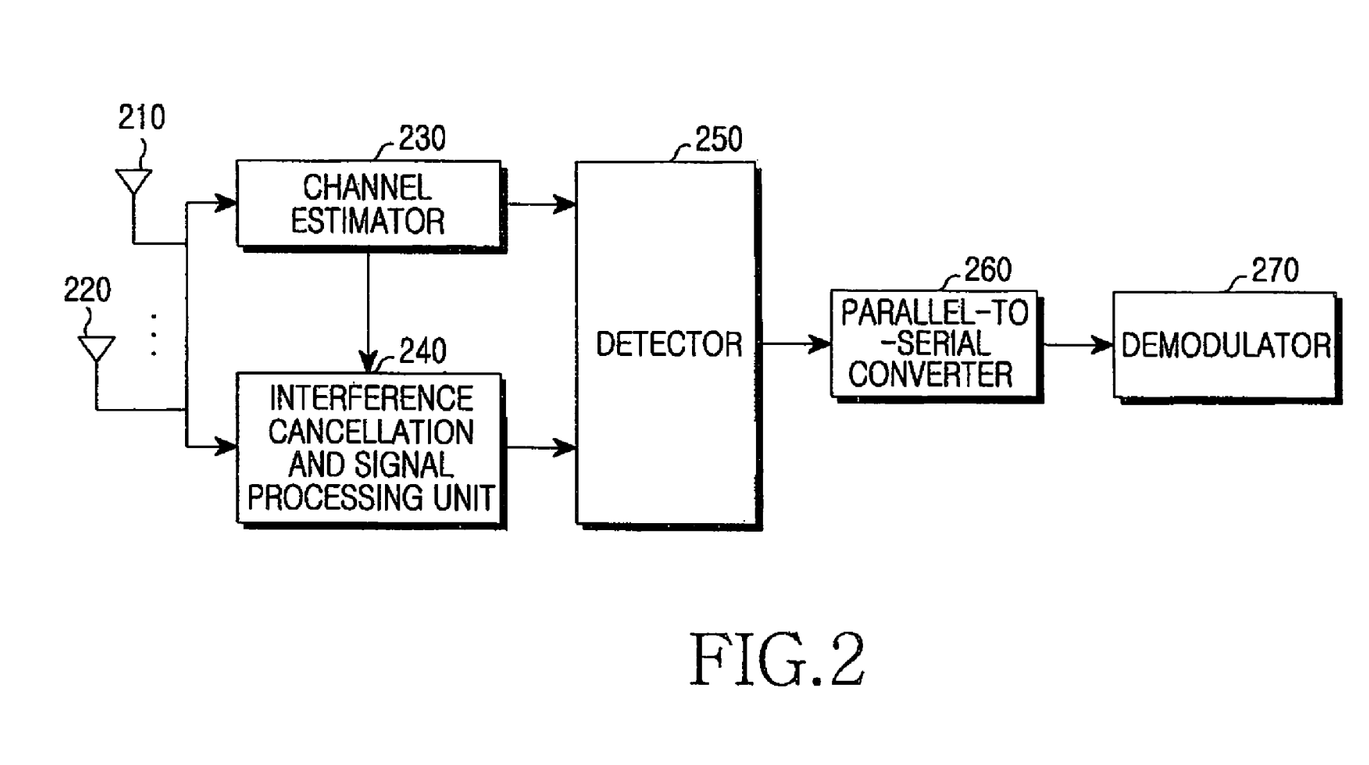
FIG. 2 is a block diagram illustrating a structure of a receiver in a multiple-antenna communication system according to the present invention.

FIG. 2 is a block diagram illustrating a structure of a receiver in a multiple-antenna communication system according to the present invention. The receiver includes a number of Rx antennas (among which the first antenna 210 and the P$^{th}$ antenna 220 are shown), a channel estimator 230, an interference cancellation and signal processing unit 240, a detector 250, a parallel-to-serial converter 260, and a demodulator 270.

Signals are received respectively through the first Rx antenna 210 to the P$^{th}$ Rx antenna 220, and are output to the channel estimator 230 and the interference cancellation and signal processing unit 240. A pilot signal is output to the channel estimator 230. A data signal is output to the interference cancellation and signal processing unit 240.

The channel estimator 230 estimates channel coefficients indicating channel gains from the signals respectively received through the first Rx antenna 210 to the P$^{th}$ Rx antenna 220, and outputs the estimated channel coefficients to the detector 250 and the interference cancellation and signal processing unit 240.

The interference cancellation and signal processing unit 240 combines the signals respectively received through the first Rx antenna 210 to the P$^{th}$ Rx antenna 220 with the channel coefficients output from the channel estimator 230 according to a predetermined rule, and then outputs Rx symbols. Further, the interference cancellation and signal processing unit 240 cancels interference received from a transmitter located in a neighboring cell. An interference cancellation scheme of the present invention will be described below in detail with reference to FIG. 3.

The detector 250 generates hypothesis symbols by multiplying the symbols received from the interference cancellation and signal processing unit 240 by the channel coefficients provided from the channel estimator 230, calculates decision statistics for all available symbols that can be transmitted by the transmitter, and thereafter detects symbols transmitted by the transmitter by performing threshold detection.

The parallel-to-serial converter 260 converts parallel data received from the detector 250 into serial data.

The demodulator 270 demodulates symbols provided from the parallel-to-serial converter 260 according to a predetermined demodulation scheme, thereby restoring originally transmitted information data bits.

Figure 3:
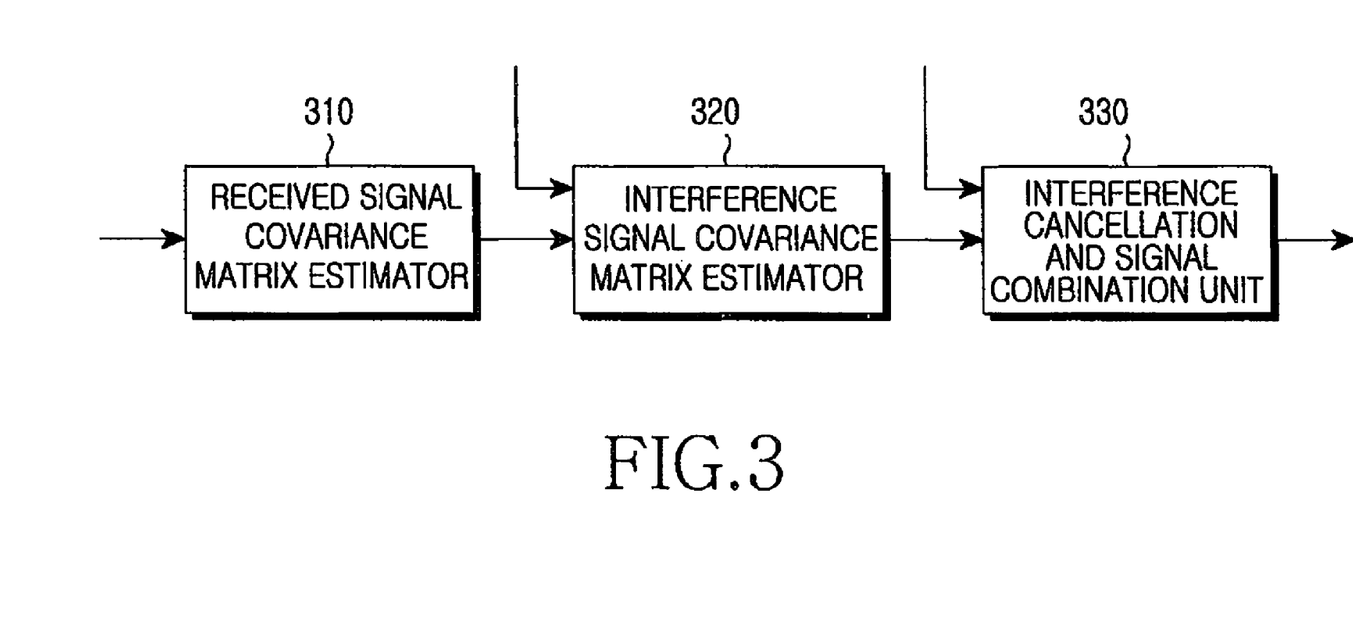
FIG. 3 is a block diagram illustrating a structure of an interference cancellation and signal processing unit of FIG. 2.

FIG. 3 is a block diagram illustrating a structure of the interference cancellation and signal processing unit 240 of FIG. 2.

The interference cancellation and signal processing unit 240 cancels interference and then outputs Rx symbols.

The Interference cancellation process is to cancel an interference signal transmitted from another transmitter located in a neighboring cell that is included in a data signal.

In the interference cancellation process, a received signal covariance matrix estimator 310 first estimates a covariance matrix for data signals respectively received through the first Rx antenna 210 to the P$^{th}$ Rx antenna 220. Then, an interference signal covariance matrix estimator 320 estimates an interference signal covariance matrix by using the channel coefficients output from the channel estimator 230 and the received signal covariance matrix output from the received signal covariance matrix estimator 310.

Thereafter, an interference cancellation and signal combination unit 330 determines an interference type by using the interference signal covariance matrix estimated by the interference signal covariance matrix estimator 320, and cancels interference by selecting an interference cancellation scheme according to the interference type.

Interference generated from transmitters located in the neighboring cell is classified into a single-signal interference type and a multiple-signal interference (i.e., STBC interference) type. In the single-signal interference type, one logical stream is transmitted. When same data is transmitted through multiple antennas, it is also included in the single-signal interference type because the number of logical streams is one even if there are multiple physical streams. In the multiple-signal interference type, multiple logical streams are simultaneously transmitted similar to the case where a plurality of signals are simultaneously transmitted by using multiple antennas. The reason of distinguishing the two types is that the number of logical streams has a significant effect as interference.

According to the interference type, interference is canceled using one of a single-symbol processing (or symbol by symbol processing) scheme in the case of single-signal interference, and is canceled using a multiple-symbol processing scheme in the case of multiple-signal interference. A predetermined threshold is used to determine the interference type. If the determination is difficult, the multiple-symbol processing scheme is selected.

After canceling interference in the signals received from the Rx antennas, the interference cancellation and signal combination unit 330 combines the interference-free signal with the channel coefficients output from the channel estimator 230 according to a predetermined rule, and then outputs Rx symbols.

Figure 4:
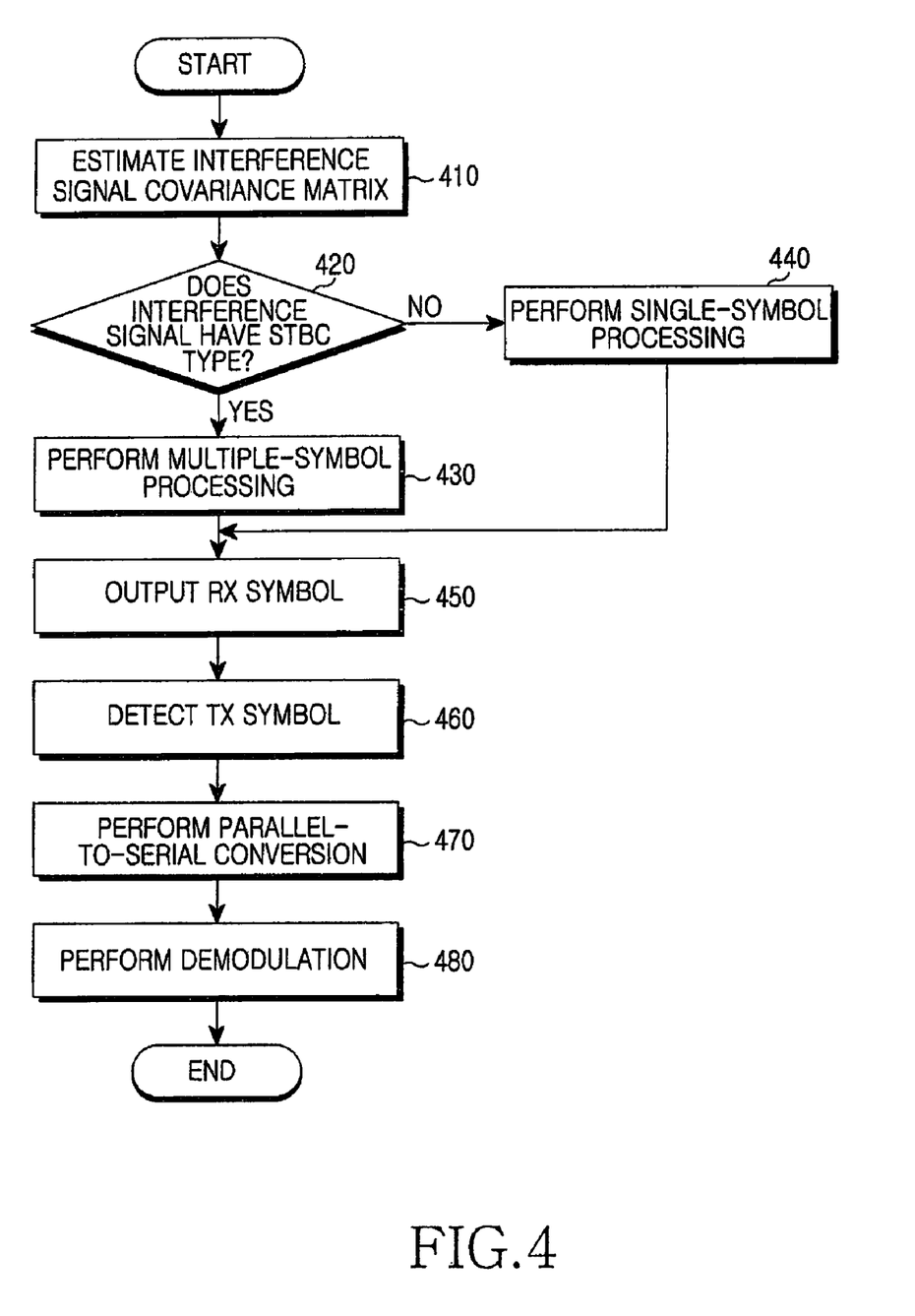
FIG. 4 is a flowchart illustrating an interference cancellation scheme in a multiple-antenna communication system according to the present invention.

FIG. 4 is a flowchart illustrating an interference cancellation scheme in a multiple-antenna communication system according to the present invention.

First, an interference signal covariance matrix is estimated in step 410. The interference signal covariance matrix is estimated by using a channel coefficient and a received data signal covariance matrix, each of which is obtained through estimation. The received data signal covariance matrix is estimated for a received data signal. In practice, the received data signal covariance matrix is added to the interference signal covariance matrix to obtain a covariance matrix of a received signal including an interference signal.

Next, it is determined whether an interference type is an STBC type by using the interference signal covariance matrix in step 420.

The STBC type represents interference when multiple logical streams are simultaneously transmitted similar to the case where a transmitter located in a neighboring cell simultaneously transmits a plurality of signals by using multiple antennas. This is different from interference in association with one logical stream (or multiple physical streams in the case where the same data is transmitted through multiple antennas even if multiple antennas are used) similarly to the case where the transmitter located in the neighboring cell transmits signals by using one antenna.

That is, the interference type is classified into the STBC type (the multiple-signal interference type) and the single-signal interference type. The reason of classifying the interference type is to select a different interference cancellation scheme according to the interference type because the number of logical streams has a significant effect as interference.

The interference signal covariance matrix may be calculated to determine whether the interference type is the STBC type. The interference signal covariance matrix is a correlation matrix of an Rx signal ZR(t) received at time t and an Rx signal ZR(t+1) received at time t+1. If an off-diagonal element of the interference signal covariance is zero, it is determined that the STBC-type interference does not exist; otherwise, if the off-diagonal element thereof is not zero, it is determined that the STBC-type interference exists.

The covariance matrix is computed as follows.

Hereinafter, $(\cdot)^*$, $(\cdot)^T$, and $(\cdot)^H$ respectively denote conjugate, transpose, and conjugate-transpose operations.

A signal received by a receiver can be expressed as Equation (1) below.

$$z = \sqrt{P_0} H_0 m_0 + \sum_{i=1}^{L} \sqrt{P_i} H_i m_i + v \qquad (1)$$

In Equation (1), $P_0$ is a power for an desired transmit signal, $P_i$ is a transmit power for an interference signal, $H_0$ is a channel matrix for an desired transmit signal, $H_i$ is a channel matrix for an interference signal, $m_0$ is desired signal, $m_i$ is an interference signal, v is a additive white Gaussian noise.

A first scenario will now be described in which an interference signal is not an STBC signal. The first scenario includes the following two cases.

In the first case, a desired signal transmitted from a desired transmitter is a Single Input Multiple Output (SIMO) signal. In this case, a channel matrix in a time duration between t and t+1 is expressed as:

$$H_0 = \begin{bmatrix} h_0(t) & 0 \\ 0 & h_0(t+1) \end{bmatrix}.$$

Herein, $h_0(t)$ is a 1×P channel matrix at time t, where P the number of Rx antennas and $h_0(t+1)$ is a 1×P channel matrix at time t+1, where P the number of Rx antennas.

In the second case, the desired signal transmitted from the desired transmitter is an STBC signal. In this case, the channel matrix in the time duration between t and t+1 is expressed as:

$$H_0 = \frac{1}{\sqrt{2}} \begin{bmatrix} h_{01}(t) & h_{02}(t) \\ -h_{02}^*(t+1) & h_{01}^*(t+1) \end{bmatrix}.$$

Herein, $h_{01}(t)$ is a channel for a signal received from a first antenna of the desired transmitter at time t, $h_{01}(t+1)$ is a channel for a signal received from a first antenna of the desired transmitter at time t+1, $h_{02}(t)$ is a channel for a signal received from a second antenna of the desired transmitter at time t, and $h_{02}(t+1)$ is a channel for a signal received from a second antenna of the desired transmitter at time t+1.

A channel matrix for an undesired Transmit (Tx) signal i received from an undesired transmitter located in a neighboring cell is expressed as:

$$H_i = \begin{bmatrix} h_i(t) & 0 \\ 0 & h_i(t+1) \end{bmatrix}.$$

Herein, $h_i(t)$ is a 1×P channel matrix at time t, where P the number of Rx antennas and $h_i(t+1)$ is a 1×P channel matrix at time t+1, where P the number of Rx antennas.

A signal transmitted from the desired transmitter at times t and t+1 is expressed as:

$$m_0 = \begin{bmatrix} X_0(t) \\ X_0(t+1) \end{bmatrix}.$$

wherein $X_0(t)$ is a signal transmitted from the desired transmitter at times t, $X_0(t+1)$ is a signal transmitted from the desired transmitter at times t+1.

An interference signal transmitted from the undesired transmitter is expressed as:

$$m_i = \begin{bmatrix} X_i(t) \\ X_i(t+1) \end{bmatrix}.$$

wherein $X_i(t)$ is an interference signal transmitted from the undesired transmitter at times t, $X_i(t+1)$ is an interference signal transmitted from the undesired transmitter at times t+1.

It is assumed hereinafter that variances of symbols are $\sigma_X^2$, v is a Gaussian noise (v~CN(0,$N_0$,$I_Q$)), and $P_i$ is Tx power of a signal transmitted from an $i^{th}$ transmitter.

A result of linear MMSE estimation on the symbols for two consecutive durations is expressed as Equation (2) below.

$$\hat{m}_0 = \sqrt{P_0}\sigma_X^2 H_0^H R_{XX}^{-1} Z \quad (2)$$

In Equation (2), $P_0$ is a power for an desired transmit signal, $H_0$ is a channel matrix for an desired transmit signal, $\sigma_X^2$ is variances of symbols, $R_{zz}$ is a covariance matrix, Z is a received signal.

The covariance matrix $R_{zz}$ of an Rx signal including an interference signal is expressed as Equation (3) below.

$$R_{zz} = E(zz^H) = \sigma_X^2 P_0 H_0 H_0^H + \sigma_X^2 \sum_{i=1}^{l} P_i H_i H_i^H + N_0 I_{2P} \quad (3)$$

In Equation (3), $P_0$ is Tx power, $H_0$ is a channel matrix for a desired signal, $H_i$ is a channel matrix for an interference signal, $N_0$ is a Gaussian noise, $\sigma_X$ is a variance, and $I_{2P}$ is a unit vector, where P is the number of Rx antennas.

Now, a second scenario will be described in which an interference signal is an STBC signal, and a desired signal is not the STBC signal. If the interference signal received from a desired transmitter is the STBC signal, a channel matrix in a time duration between t and t+1 is expressed as:

$$H_k = \begin{bmatrix} h_k(t) & 0 \\ 0 & h_k(t+1) \end{bmatrix},$$

where $h_k(t)$ is a 2×P channel matrix of a channel between a receiver and a $k^{th}$ receiver generating the interference signal. In this case, an interference Tx signal is $m_k = [X_1 \ X_2 \ -X_2^* \ X_1^*]$.

An Rx signal is defined as Equation (4) below.

$$z^R = \begin{bmatrix} \text{Re}(z) \\ \text{Im}(z) \end{bmatrix} = \sum_{i=0}^{l} \begin{bmatrix} \text{Re}(H_i) & -\text{Im}(H_i) \\ \text{Im}(H_i) & \text{Re}(H_i) \end{bmatrix} \begin{bmatrix} \text{Re}(m_i) \\ \text{Im}(m_i) \end{bmatrix} + \begin{bmatrix} \text{Re}(v) \\ \text{Im}(v) \end{bmatrix} = \sum_{i=0}^{l} H_i^R m_i^R + v^R \quad (4)$$

In Equation (4), Re(z) is a real part of z, Im(z) is a imaginary parts of z, $H_i$ is $i^{th}$ channel matrix, $m_i$ is $i^{th}$ transmit signal, v is a additive white Gaussian noise.

A result of linear MMSE estimation for the Rx signal is expressed as Equation (5) below.

$$\hat{m}_0^R = \sqrt{P_0}\sigma_X^2 H_0^{R^T} R_{z^R z^R}^{-1} z_0^R \quad (5)$$

In Equation (5), $P_0$ is a power for an desired transmit signal, $H_0$ is a channel matrix for an desired transmit signal, $\sigma_X^2$ is variances of symbols, $R_{zz}$ is a covariance matrix, $z_0$ is a received signal. R represents a real part.

A covariance matrix of the Rx signal including the interference signal is expressed as Equation (6) below.

$$R_{z^R z^R} = \sigma_X^2 P_0 H_0^R H_0^{R^T} + \sum_{i=1}^{l} \frac{P_i}{2} H_i^R E(m_i^R m_i^{R^T}) H_i^{R^T} + \frac{1}{2} N_0 I_{2P} \quad (6)$$

In Equation (6), $P_0$ is Tx power, $H_0$ is a channel matrix for a desired signal, $H_i$ is a channel matrix for an interference signal, $N_0$ is Gaussian noise, $\sigma_X$ is a variance, $I_{2P}$ is a unit vector (where P is the number of Rx antennas), E(•) is an averaging operation, and $(•)^R$ is a real part operation.

Referring back to FIG. 4, if the multiple-signal interference is determined as the interference type, interference is canceled according to the multiple-symbol processing scheme in step 430.

In the case of the single-signal interference, the inference is canceled according to the single-symbol processing (or symbol by symbol processing) scheme in step 440.

Even when the multiple-symbol processing scheme is initially set in the communication system, it is also possible to allow the interference to be canceled according to the single-symbol processing scheme in the case of the single-signal interference type and according to the multiple-symbol processing scheme in the case of the multiple-signal interference type.

Next, signals obtained by canceling interference from the received signal are combined with estimated channel coefficients according to a predetermined rule, and as a result, Rx symbols are output in step 450.

Next, hypothesis symbols are generated by multiplying the Rx symbols by the channel coefficients, and symbols transmitted by the transmitter are detected by using the hypothesis symbols in step 460.

Next, the detected parallel symbols (or data) are converted into serial symbols (or data) in step 470.

Next, the serial symbols are demodulated according to a predetermined demodulation scheme, and thus originally transmitted information data bits are restored in step 480.

Figure 5:
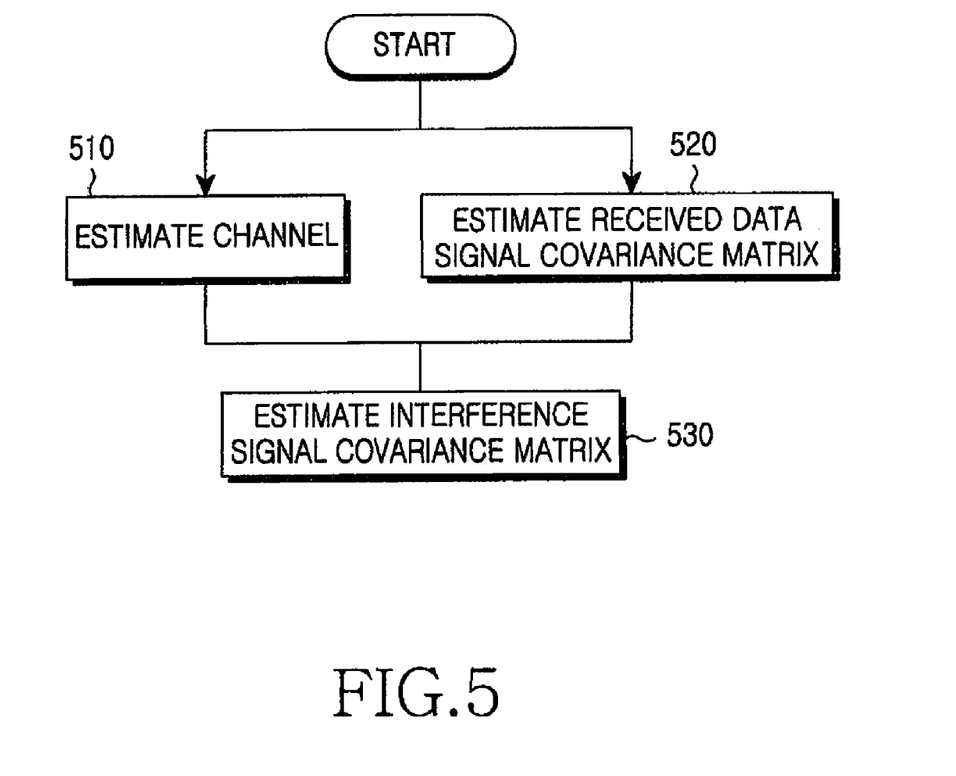
FIG. 5 is a flowchart illustrating a process of estimating an interference signal covariance matrix in a multiple-antenna system according to the present invention.

FIG. 5 is a flowchart illustrating a process of estimating an interference signal covariance matrix in a multiple-antenna system according to the present invention.

Among the signals received through multiple antennas, a pilot signal is output to the channel estimator 230 to estimate channel coefficients indicating channel gains in step 510.

Next, among the signals received through the multiple antennas, a data signal is output to estimate a received data signal covariance matrix in step 520.

The estimation on the received data signal covariance matrix may be performed prior to or simultaneously with the estimation on the channel coefficients.

Next, an interference signal covariance matrix is estimated by using the estimated channel coefficients and the received data signal covariance matrix in step 530.

Figure 6:
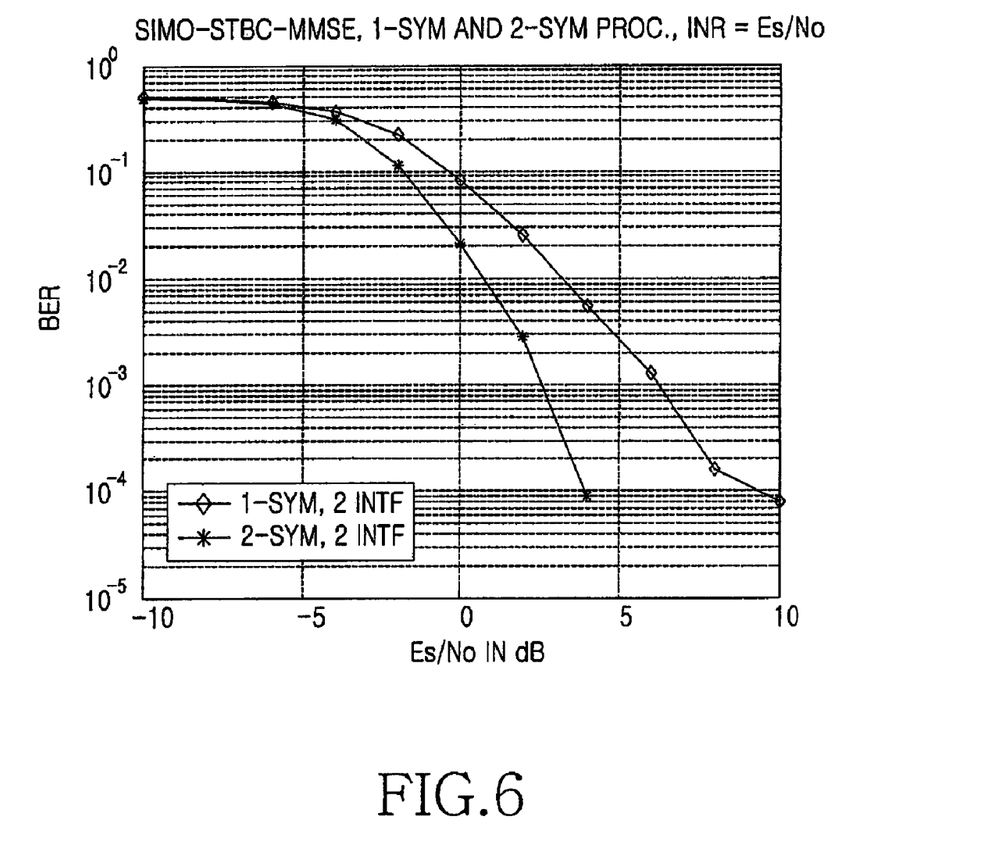
FIG. 6 is a graph illustrating performance when multiple-logical-stream type interference is canceled using a multiple-symbol processing scheme in a multiple-antenna system according to the present invention.

FIG. 6 is a graph illustrating performance obtained when multiple-logical-stream type interference is canceled using a multiple-symbol processing scheme in a multiple-antenna system according to the present invention.

In the presence of the multiple-logical-stream type interference, a single-symbol processing scheme and a multiple-symbol processing (herein, two-symbol processing) scheme are compared in terms of performance. The comparison result shows that the multiple-symbol processing (herein, two-symbol processing) scheme has a better performance. Herein, the communication system is an SIMO system having a transmitter using one antenna and a receiver having five antennas. A transmitter located in a neighboring cell uses two antennas. A symbol is detected using an MMSE scheme.

According to the present invention, a receiver of a multiple-antenna communication system cancels interference by selecting either a multiple-symbol processing scheme or a single-symbol processing scheme depending on a signal type, thereby improving performance of the communication system.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A receiver comprising:
    at least two antennas for receiving signals from a first transmitter and a plurality of second transmitters;
    a channel estimator for estimating channel coefficients by using the signals received through the at least two antennas;
    an interference cancellation and signal processing unit for canceling interference in the signals received through the plurality of second transmitters by using the channel coefficients according to a predetermined interference cancellation scheme selected according to whether a type of the interference in the received signal is Space Time Block Coded (STBC) interference type, and for outputting the signal received from the first transmitter; and
    a detector for generating hypothesis symbols by multiplying the signals received from the interference cancellation and signal processing unit by the channel coefficients provided from the channel estimator, and for detecting symbols transmitted from the transmitters.

2. The receiver of claim 1, wherein the first transmitter is a Base Station (BS) or a Mobile Station (MS) located in a serving cell, and the second transmitters are BSs or MSs located in one or more neighboring cells.

3. The receiver of claim 1, further comprising:
    a parallel-to-serial converter for converting parallel symbols output from the detector into serial symbols; and
    a demodulator for demodulating the symbols output from the parallel-to-serial converter according to a predetermined demodulation scheme to restore originally transmitted information data bits.

4. The receiver of claim 1, wherein the interference cancellation and signal processing unit comprises:
    a received data signal covariance matrix estimator for estimating a covariance matrix of a data signal received through the multiple antennas;
    an interference signal covariance matrix estimator for estimating a covariance matrix of an interference signal by using the channel coefficients output from the channel estimator and the estimated covariance matrix of the received data signal; and
    an interference cancellation and signal combination unit for determining the interference type by using the estimated interference signal covariance matrix and for selecting an interference cancellation scheme according to the interference type.

5. The receiver of claim 4, wherein the interference type is classified into one of a single-signal interference type and the STBC interference type according to whether a transmitter located in a neighboring cell transmits one logical stream or simultaneously transmits multiple logical streams.

6. The receiver of claim 5, wherein, if an off-diagonal element of the estimated interference signal covariance matrix is zero, the receiver determines that STBC-type interference does not exist, and otherwise, if the off-diagonal element thereof is not zero, the receiver determines that STBC-type interference exists.

7. The receiver of claim 5, wherein interference is canceled by using a single-symbol processing scheme as for the single-signal interference type and a multiple-symbol processing scheme as for the STBC-type interference.

8. The receiver of claim 1, wherein the signal received from the first transmitter is a signal of one logical stream.

9. A method of receiving data in a receiver using at least two antennas, the method comprising:
    receiving signals from a first transmitter and a plurality of second transmitters;
    estimating an interference signal covariance matrix for interference signals received from the second transmitters;
    determining whether an interference type is a Space Time Block Coded (STBC) type by using the estimated interference signal covariance matrix; and
    if the interference type is the STBC type, canceling interference according to a multiple-symbol processing scheme.

10. The method of claim 9, wherein the first transmitter is a Base Station (BS) or a Mobile Station (MS) located in a serving cell, and the second transmitters are BSs or MSs located in at least one neighboring cell.

11. The method of claim 9, wherein the interference signal covariance matrix is estimated by using a channel coefficient and a received data signal covariance matrix for a received data signal, each of which is obtained through estimation.

12. The method of claim 9, wherein, if the interference type is the STBC type, the interference occurs when multiple logical streams are simultaneously transmitted by a transmitter that have multiple antennas located in a neighboring cell.

13. The method of claim 9, further comprising canceling interference according to a single-symbol processing scheme if the interference type is not the STBC type.

14. The method of claim 13, wherein, if the interference type is not the STBC type, the interference occurs when one logical stream is transmitted by a transmitter that have single antenna located in a neighboring cell.

15. The method of claim 9, further comprising:
combining the signals obtained by canceling interference from the received signals with the estimated channel coefficients according to a predetermined rule, and outputting Receive (Rx) symbols;
generating hypothesis symbols by multiplying the Rx symbols by the channel coefficients, and detecting parallel symbols or parallel data transmitted from the transmitters by using the hypothesis symbols;
converting the detected parallel symbols or the detected parallel data into serial symbols or serial data; and
demodulating the serial symbols or serial data according to a predetermined demodulation scheme to restore originally transmitted information data bits.

16. The method of claim 9, wherein the signal transmitted from the first transmitter is a signal of one logical stream.

17. A receiver using multiple antennas, comprising:
means for receiving signals from a first transmitter and a plurality of second transmitters;
means for estimating an interference signal covariance matrix for interference signals received from the second transmitters;
means for determining whether an interference type is a Space Time Block Coded (STBC) type by using the estimated interference signal covariance matrix; and
means for, if the interference type is the STBC type, canceling interference according to a multiple-symbol processing scheme.

18. The receiver of claim 17, wherein the first transmitter is a Base Station (BS) or a Mobile Station (MS) located in a serving cell, and the second transmitters are BSs or MSs located in one or more neighboring cells.

* * * * *